United States Patent
Wei et al.

(10) Patent No.: US 8,342,033 B2
(45) Date of Patent: Jan. 1, 2013

(54) METHOD FOR AVOIDING OVERLOADING OF A SHAFT

(75) Inventors: Huanmin Wei, Frankenthal (DE); Wilfried Heide, Freinsheim (DE); Annemarie Hillebrecht, Künzell (DE); Oskar Stephan, Hockenheim (DE); Asif Karim, Mannheim (DE)

(73) Assignee: BASF SE, Ludwigshafen (DE)

( * ) Notice: Subject to any disclaimer, the term of this patent is extended or adjusted under 35 U.S.C. 154(b) by 303 days.

(21) Appl. No.: 12/663,867

(22) PCT Filed: Jun. 10, 2008

(86) PCT No.: PCT/EP2008/057192
§ 371 (c)(1), (2), (4) Date: Dec. 10, 2009

(87) PCT Pub. No.: WO2008/152024
PCT Pub. Date: Dec. 18, 2008

(65) Prior Publication Data
US 2010/0171490 A1 Jul. 8, 2010

(30) Foreign Application Priority Data
Jun. 11, 2007 (EP) .................................... 07109976

(51) Int. Cl.
*G01N 3/32* (2006.01)
(52) U.S. Cl. ........................................................ 73/812
(58) Field of Classification Search ..................... 73/812
See application file for complete search history.

(56) References Cited

U.S. PATENT DOCUMENTS

| 4,527,904 A | 7/1985 | Weetman |
| 5,453,688 A * | 9/1995 | Cecco et al. .................. 324/220 |
| 5,533,400 A | 7/1996 | Gasch et al. |

FOREIGN PATENT DOCUMENTS

| CA | 2 070 539 A1 | 12/1992 |
| DE | 3437379 A1 | 4/1985 |
| EP | 0124383 A1 | 11/1984 |
| EP | 0 517 068 A1 | 12/1992 |
| EP | 0585623 A2 | 3/1994 |

OTHER PUBLICATIONS

International Search Resort in PCT/EP/2008/057192 dated Sep. 15, 2008.

* cited by examiner

*Primary Examiner* — Lisa Caputo
*Assistant Examiner* — Octavia Davis-Hollington
(74) *Attorney, Agent, or Firm* — Marshall, Gerstein & Borun LLP

(57) ABSTRACT

The invention relates to a method for monitoring the bending of a shaft, particularly a shaft in a mixing kneader, the shaft having a bearing at least on one side. In a first step, the deviation of the shaft from the radial position is measured on at least one position different from the bearing of the shaft. In a further step, a reference value is optionally determined from the measured deviation from the radial position. In a third step, the deviation from the radial position as measured in the first step or the reference value found in the second step is compared with a predetermined limit value.

12 Claims, 3 Drawing Sheets

METHOD FOR AVOIDING OVERLOADING OF A SHAFT

CROSS-REFERENCE TO RELATED APPLICATIONS

This is the U.S. national phase of International Application No. PCT/EP2008/057192, filed Jun. 10, 2008, which claims the benefit of European Patent Application No. 07109976.6, filed Jun. 11, 2007.

The invention relates to a method for preventing overloads by monitoring the bending of a shaft, particularly a shaft in a mixing kneader, the shaft having a bearing at least on one side.

Mixing kneaders are used for example in order to produce finely divided crosslinked polymers. Such a mixing kneader with at least two axially parallel rotating shafts, on the surfaces of which disk faces with kneading bars arranged on their circumference are provided, is known for example from EP-A 0 517 068. The kneading bars are arranged so that those on one shaft engage in those on the other shaft. The number of kneading bars on the shafts can vary according to the speeds of the shafts, which may be different. With a speed ratio of 1:4, for example, eight kneading bars are arranged over the circumference on the main shaft and two kneading bars are arranged on the so-called stripping shaft, which rotates four times as fast as the main shaft.

The finely divided polymer contained in the mixing kneader presents a resistance to the rotational movement of the shafts. The effect of this is that the shafts experience a bending stress and a torsion stress, which are coupled together. In order to prevent damage to the shafts, it is necessary, when reaching a maximal permissible load or stress of the shafts, i.e. a maximal bending or torsion, to implement measures which prevent damage to the shafts. This, for example, involves switching the mixing kneader off.

It is an object of the present invention to provide a method which can prevent shafts from being damaged by overloading.

The object is achieved by a method for preventing an overload by monitoring the bending of a shaft, particularly a shaft in a mixing kneader, the shaft having a bearing at least on one side, comprising the following steps:
(a) measuring the deviation of the shaft from the radial position on at least one position different from the bearing of the shaft,
(b) optionally determining a reference value from the measured deviation from the radial position,
(c) comparing the deviation from the radial position as measured in step (a) or the reference value found in step (b) with a predetermined limit value.

In the context of the invention, deviation from the radial position is intended to mean a deviation of the shaft axis in the radial direction at any place on the shaft relative to an immobile point, for example a point on the housing, such as may result for example from bending.

The position different from the bearing, at which the deviation from the radial position is measured, can be any position on the shaft, where the shaft is not supported. Preferably however, the measuring is carried out on one side of the shaft, particularly in a marginal region close to the bearing The bending of the entire shaft can be determined from the deviation of the shaft from the radial position. For example, the bending of the shaft may be calculated from the determination of the deviation from the radial position with the aid of a finite element simulation of the shaft structure. As an alternative, it is also possible to consider the shaft as a resilient flexural beam.

For example, the maximum permissible bending of the shaft, with which damage to the shaft is still avoided, may also be determined from the modeling. The maximum permissible bending of the shaft depends on the physical properties of the material from which the shaft is made. In particular, the maximum permissible bending depends on the resilience and the yield point of the material from which the shaft is made. The maximum permissible bending of the shaft also depends on the geometry of the shaft structure, the bearing of the shaft or the distance between the kneading bars on the shaft and the housing. For example, the kneading bars should be prevented from scraping along the housing wall during operation of the mixing kneader. This would lead to greater exertion of force in order to move the shaft, and on the other hand metal shavings, which contaminate the product contained in the mixing kneader, could thereby be scraped from the wall.

Since the maximum bending of the shaft can be deduced from the deviation from the radial position at an arbitrary place on the shaft, this one measurement is sufficient in order to permit reliable operation of the mixing kneader. In particular, deducing the maximum bending can prevent the shafts of the mixing kneader from being overloaded.

As an alternative, the maximum permissible bending and therefore the maximum permissible deviation from the radial position may also be determined experimentally.

In order to measure the deviation of the shaft from the radial position, it is preferable to use at least two measurement value transducers mutually offset radially in order to record the direction of the deviation from the radial position. Two measurement value transducers mutually offset radially by 90° are particularly preferably used. Using the sensors mutually offset radially, the deviation in two different directions can be determined. The overall deviation of the shaft from the radial position can be determined therefrom. When using only one measurement value transducer, in particular, it is not possible to record a deviation from the radial position which takes place transversely to the measurement direction of the measurement value transducer since the distance between the sensor and the shaft remains constant in this case.

In order to calibrate the measurement signals, it is preferable for the deviation of the shaft from the radial position to be initially measured without a load on the shaft (zero measurement). To this end, a measurement process is carried out without the mixing kneader being filled. By measuring the radial deviation without a load on the shaft, it is possible to identify for example surface irregularities of the shaft, bearing plays or material influences.

In order to find the reference value, in a preferred embodiment, the difference between the deviation from the radial position as measured without a load on the shaft and the deviation measured with a loaded shaft is determined. The difference between the deviation from the radial position as measured with a loaded shaft and the deviation measured without a load on the shaft gives the actual deviation of the shaft from the radial position. To this end, however, it is necessary to allocate the deviation of the shaft to a precise circumferential position of the shaft. In this way, the deviation with an unloaded shaft, which was measured at precisely the same circumferential position, can respectively be subtracted from the currently measured deviation (fine calibration).

As an alternative, it is also possible to form an average value of the deviation from the radial position with an unloaded shaft and subsequently take the difference between the average value and the measured deviation (coarse calibration). The advantage of this embodiment is that precise allocation of the measurement point on the shaft circumference is not necessary, and the measurement is therefore simplified since the circumferential position of the shaft does not need to be recorded.

In one embodiment, the deviation of the shaft measured by the at least two sensors is represented in an orbital representation. This means that the deviation of the shaft from the radial position in the y direction is plotted against the deviation in the x direction. In this case, the sensors are mutually offset by 90°. One sensor then measures the deviation of the shaft in the x direction and the second sensor measures the deviation of the shaft in the y direction. When presented in an orbital representation, maximum and minimum measured values of the deviation from the radial position form an envelope curve. The actual deviation is contained by the envelope curve. The envelope curve is compared with the limit value for the permissible deviation.

The limit value is preferably determined from the maximum permissible bending of the shaft.

The maximum permissible bending of the shaft, from which the limit value is determined, is formed from the permissible stress limit $\sigma_s$ of the material and a safety factor. The safety factor introduces an additional margin, which prevents the shaft from being stressed up to its loading limit even when the limit value is reached. In this way, damage to the shaft can be prevented even when the limit value is reached. The safety factor preferably lies in the range of from 1.1 to 1.3. The safety factor is particularly preferably 1.2.

When a reference value is formed from the measured deviation from the radial position, it is also preferable for a corresponding reference value to be formed for the limit value. For example, the difference between the maximum permissible deviation from the radial position and the deviation of the shaft from the radial position without a load on the shaft may be determined as a limit value. As soon as the limit value is exceeded by the measured deviation or the reference value, suitable measures are implemented. For example, it is possible to emit an alarm when the limit value is reached. With the aid of the alarm, the operator can decide whether the mixing kneader may continue to be used. The operator may also decide whether other measures can be implemented in order to reduce the load on the shafts. In one method variant, it is possible to provide a second limit value which is higher than the first limit value. In this case, it is preferable to trigger an alarm when the first limit value is reached. As soon as the second limit value is reached, it is preferable to trigger a further alarm or stop the shaft in order to prevent damage. The first limit value preferably has a value in the range of from 75 to 90%, preferably 85%, of the maximum permissible value, and the second limit value preferably lies in the range of from 95 to 100% of the maximum permissible value.

Further measures which can be implemented when the limit value is reached or exceeded are for example a reduction of the solids content for example by adding a solvent, a reduction of the part of fine grain material being recycled, or of solid additives like aerosile, clays or the like, a reduction of the temperature so that less solvent evaporates, a variation of the degree of cross-linking of the product, an addition of at least one lubricant like tensides or waxes or, alternatively, an increasing of the temperature to reduce viscosity. The suitable measure thereby depends on the use of the mixing kneader.

In a preferred embodiment, the circumferential position of the shaft is also recorded in addition to the radial position. To this end, for example, a marking which is registered by a sensor may be applied on the shaft. A suitable sensor is, for example, a keyphaser or trigger. Using a trigger, each revolution of the shaft is ascertained. With a uniform circumferential speed of the shaft, the precise circumferential position of the respectively measured deviation can be determined from the trigger signal and the deviation from the radial position as a function of time, as recorded by a sensor.

The measurement of the deviation from the radial position is carried out, for example, with the aid of an eddy current probe. Such an eddy current probe generates a magnetic field, by which the distance between the shaft and the probe is measured. Such eddy current probes are known to the person skilled in the art.

The bending of the shaft can be deduced directly from the size of the deviations from the radial position. Via the force exertion on the shaft, the bending is coupled to the torsion of the shaft. The torsion is directly proportional to the torque of the shaft. Since the bending and the torsion are coupled together via the force equilibrium on the shaft, it is also possible to determine the torsion of the shaft from the deviation from the radial position. In general, however, the flexural loading is substantially stronger than the torsional loading and is therefore critical for the stability and operational reliability of the shaft.

The maximum measured bending d of a shaft is given by:

$$d = \sqrt{|x-x_0|_{max}^2 + (|y-y_0|_{max}^2 \pm y_{EG})^2}$$

for fine calibration, or $$d = \sqrt{(|x|_{max} - |x_0|_{average} + |x_{Opp}|)^2 + (|y_{max}| - |y_0|_{average} + |y_{Opp}| \pm y_{ow})^2}$$

for course calibration, with the maximum absolute value of the difference between the currently measured value and the value of the zero measurement at the same position over a defined time period in the x direction $|x-x_0|_{max}$, the maximum absolute value of the difference between the currently measured value and the value of the zero measurement at the same position over a defined time period in the y direction $|y-y_0|_{max}$, the deviation due to its own weight $y_{OW}$, the absolute value of the maximum measured value in the x direction over a defined time period $|x|_{max}$, the absolute value of the average value of the zero measurement in the x direction $|x_0|_{average}$, the absolute value of the difference between the maximum and minimum values of the zero measurement $|x_{Opp}|$, the absolute value of the maximum measured value in the y direction over a defined time period $|y|_{max}$, the absolute value of the average value of the zero measurement in the y direction $|y_0|_{average}$, and the absolute value of the difference between the maximum and minimum values of the zero measurement in the y direction $|y_{Opp}|$.

The positive or negative superimposition of $\pm y_{OW}$ depends on the shaft loading situation. When the maximum deviation from the radial position takes place in the y direction i.e. in the direction in which gravity acts, $y_{OW}$ is added thereto, and in the converse case i.e. when the maximum deviation from the radial position takes place opposite to the direction in which gravity acts, $y_{OW}$ is subtracted.

An embodiment of the invention will be described in more detail below with the aid of drawings, in which.

Figure 1:
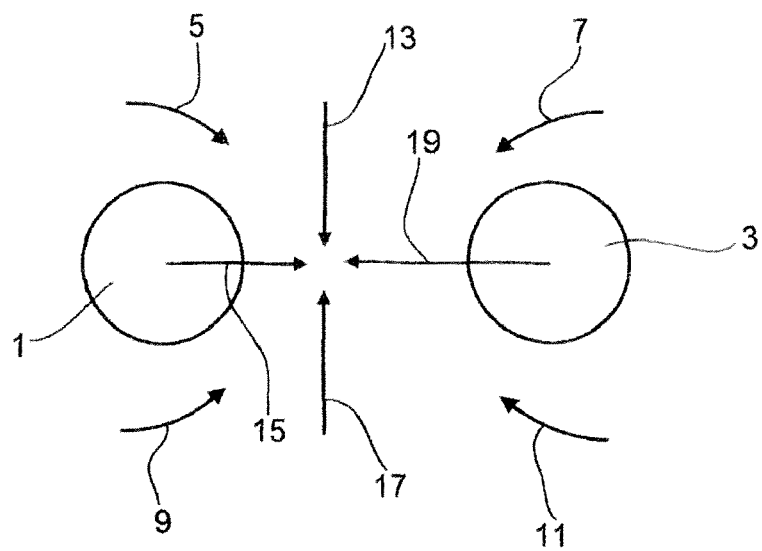
FIG. 1 shows a schematic representation of the force distribution in a mixing kneader with two shafts.

FIG. 1 schematically represents the force distribution in a mixing kneader with two shafts.

A mixing kneader with two shafts comprises a stirring shaft 1 and a stripping shaft 2. Generally, in a mixing kneader, kneading bars which may have any suitable shape are arranged both on the stirring shaft 1 and on the stripping shaft 3. The number of kneading bars distributed over the circumference on the stirring shaft 1 may differ from that on the stripping shaft 3. When there are different numbers of kneading bars on the stirring shaft 1 and the stripping shaft 3, these are usually driven with different speeds. The term stripping shaft 3 refers to the shaft which has fewer kneading bars distributed over the circumference, and which rotates more rapidly. The speed ratio depends on the ratio of the number of kneading bars. The stirring shaft 1 and the stripping shaft 3 may be driven either in the same sense or, as represented in FIG. 1, in opposite senses.

A rotating movement is imparted to the stirring shaft 1 and the stripping shaft 3 by a drive. This results in a first torque 5 on the stirring shaft 1 and a second torque 7 on the stripping shaft 3.

Owing to the kneading processes, in which the kneading bars on the stirring shaft 1 and the stripping shaft 3 enter the substance to be kneaded and comminute it, a first resistance 9, which is directed oppositely to the first torque 5, acts on the stirring shaft 1. A second resistance 11, which is directed oppositely to the second torque 7 of the stripping shaft 3, acts on the stripping shaft 3. If the kneading bars of the stirring shaft 1 scrape the housing, then the first resistance 9 is increased further. Correspondingly, the second resistance 11 of the stripping shaft 3 is increased further if the kneading bars of the stripping shaft 3 scrape the housing.

The torques 5, 9; 7, 11 acting in opposite directions on the stripping shaft 3 and the stirring shaft 1 lead to torsional stressing of the respective shaft 1, 3.

Owing to the kneading process, a force respectively due to the other shaft furthermore acts on the stirring shaft 1 and the stripping shaft 3. For the mathematical modeling, the force respectively imposed on the other shaft 1, 3 is converted into a force which is exerted at an equivalent length. This is necessary since the force respectively exerted acts on the shaft while being distributed over the distance. The force on the stirring shaft 1 due to the stripping shaft 3 is represented by an arrow 13. The force 13 is also referred to as a support force. The point of action of the force 13 is obtained, for example, from a load model which is based on laboratory experiments and operational measurements. The equivalent distance, at which the force 13 is exerted on the stirring shaft 1, is represented by an arrow 15. Correspondingly, a support force 17 due to the stirring shaft 1 also acts on the stripping shaft 3. The equivalent distance, at which the support force 17 is exerted on the stripping shaft 3, is denoted by the reference 19.

The maximum permissible bending of the stripping shaft 3 and of the stirring shaft 1 is respectively to be considered independently for the stripping shaft 3 and the stirring shaft 1.

Figure 2:
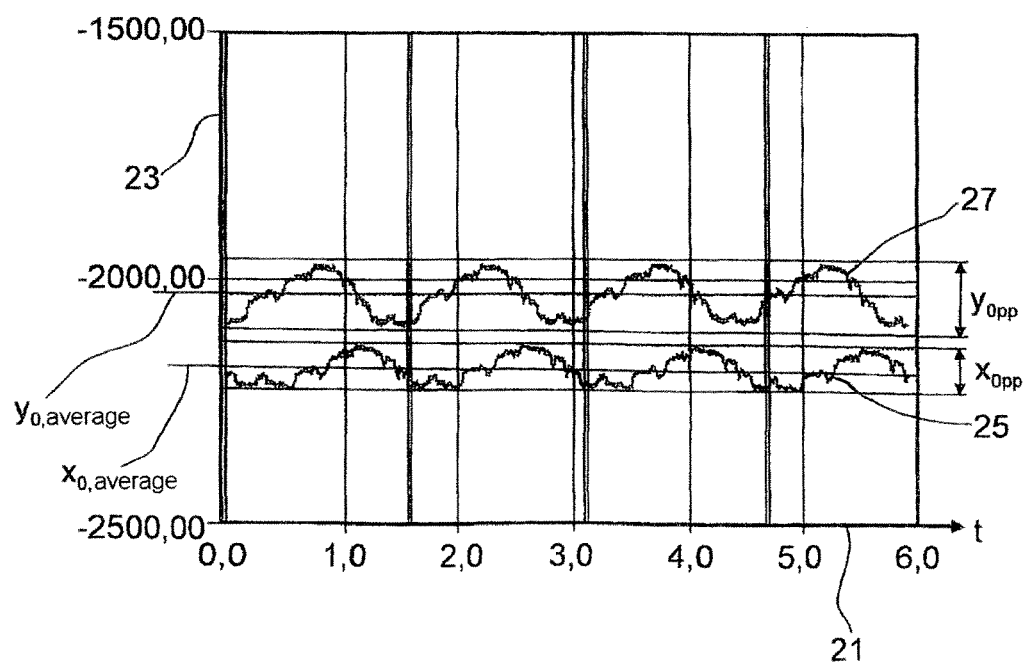
FIG. 2 shows a signal profile of a zero measurement.

The maximum permissible loading can be calculated, for example by a finite element method or a beam model, from the schematic model of the force distribution on the stirring shaft 1 and the stripping shaft 3 as represented schematically in FIG. 1, FIG. 2 represents a signal profile of a zero measurement for the stripping shaft 3. The time t is plotted on the x axis 21 and the deviation in the radial position is plotted on the y axis 23. The measurement was carried out with two sensors mutually offset by 90°, in order to determine the deviation in the x direction and the y direction.

FIG. 2 represents the profile for four revolutions of the stripping shaft 3. In the embodiment represented here, a revolution lasts 1.6 seconds. It is of course also possible for the stripping shaft to rotate more rapidly or more slowly.

Reference 25 represents the deviation in the x direction and reference 27 represents the deviation in the y direction. It can be seen that the deviation has a sinusoidal profile. The maximum is respectively offset by 90° between the deviation in the x direction 25 and the deviation in the y direction 27. This is attributable to the fact that no load is acting on the shaft. The deviation is due merely to manufacturing tolerances and unevennesses as well as the surface treatment on the stripping shaft 3. The average value $|x_0|_{average}$, $|y_0|_{average}$, as well as the values of $|x_{Opp}|$ and $|y_{Opp}|$ can be determined from the zero measurement.

Figure 3:
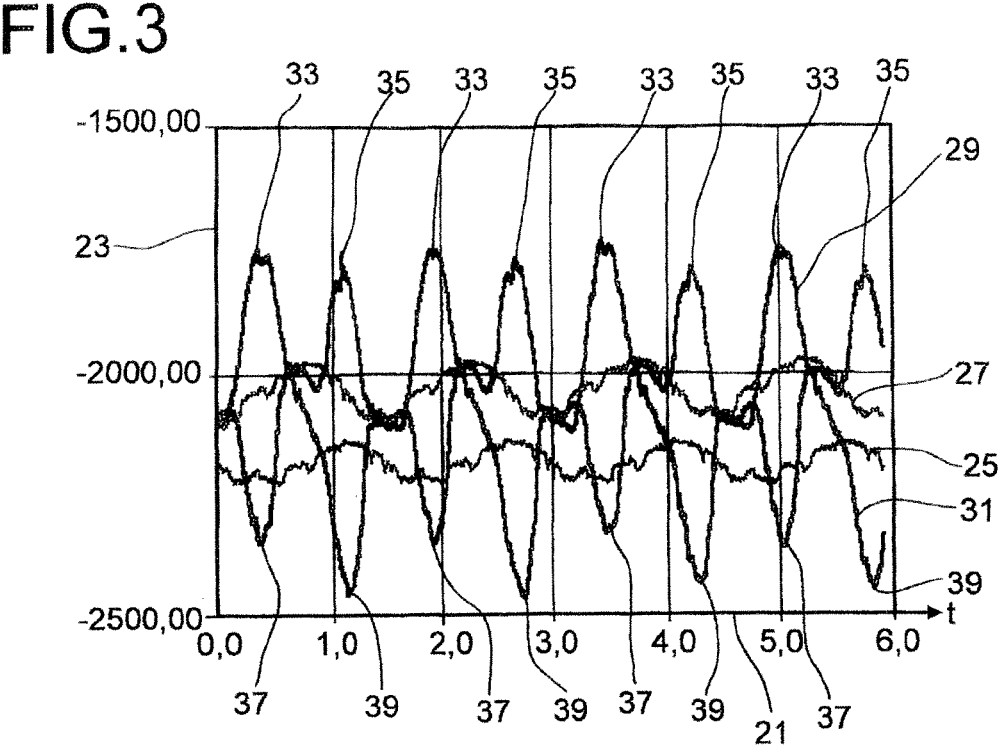
FIG. 3 shows a signal profile with a loaded shaft together with the zero measurement.

FIG. 3 represents a signal profile for a loaded shaft together with the zero measurement.

Likewise as in FIG. 2, in FIG. 3 the time is plotted on the x axis 21 and the deviation from the neutral position for four revolutions of the stripping shaft 3 is represented on the y axis 23. Reference 29 denotes the measurement in the x direction and reference 31 denotes the measurement in the y direction. In FIG. 3, it can be seen that the measurement profile in the x direction has a first maximum 33 and a second maximum 35 per revolution. The first maximum 33 and the second maximum 35 respectively represent the greatest deviation of the stripping shaft 3 from the neutral position. At the positions where the profile in the x direction has the first maximum 33 and the second maximum 35, the measurement in the y direction 31 shows a first minimum 37 and a second minimum 39. These also respectively represent the greatest deviation from the neutral position.

The first maximum 33 and the second maximum 35, and the first minimum 37 and the second minimum 39, are attributable to the fact that the stripping shaft 3 has two kneading bars distributed over the circumference. Each time the position of the kneading bars is at a place where they engage with the kneading bars of the stirring shaft 1, the greatest force acts on the stripping shaft 3. This leads to an increase in the load and therefore greater bending. Owing to the kneading bars arranged offset at an angle of 180° on the stripping shaft 3, this leads to two excursions in the measurement during a revolution. The deviation is least when no kneading bars are engaged in one another. This leads to the oscillatory loading of the shaft which can be seen in FIG. 3.

Figure 4:
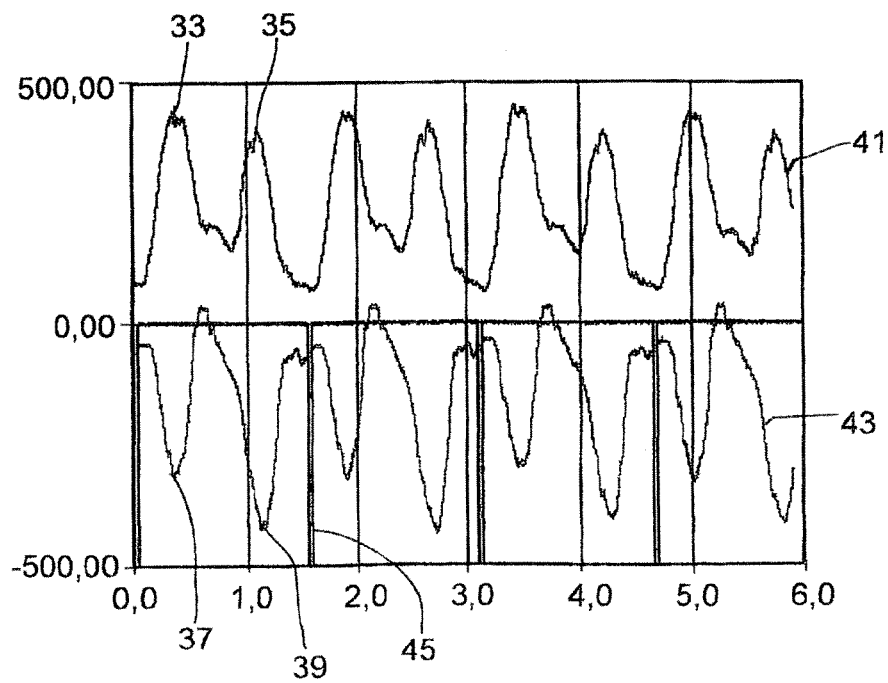
FIG. 4 shows a signal profile with coarse calibration.

FIG. 4 represents a signal profile with coarse calibration.

For coarse calibration, an average value $x_{0,average}$, $y_{0,average}$ is formed from the zero measurement, as represented in FIG. 2. This average value $x_{0,average}$, $y_{0,average}$ is respectively subtracted in the x direction and in the y direction from the profile measured with a loaded shaft. Since a constant value is subtracted in each case, the profiles in the x direction and the y direction for a loaded shaft resemble the uncalibrated profiles of the measurements as represented in FIG. 3. The coarsely calibrated signal profile in the x direction 41 likewise has a first maximum 33 and a second maximum 35 for each revolution of the stripping shaft 3. The coarsely calibrated signal profile in the y direction 43 also has a first minimum 37 and a second minimum 39 per revolution of the stripping shaft 3. As described above, the maxima 33, and minima 37, 39 are due to the interlocking of the stripping shaft 3 and the stirring shaft 1, two kneading bars being arranged distributed over the circumference on the stripping shaft 3. Each time the kneading bars on the stripping shaft 3 engage through the kneading bars of the stirring shaft 1, a maximal force acts on the stripping shaft 3, which leads to greater bending of the shaft and therefore to an increased excursion.

FIG. 4 additionally represents a trigger signal 45, which respectively exhibits an excursion after a revolution of the stripping shaft 3. In this way, the deviation from the radial position can respectively be allocated to a precise position of the shaft 1, 3.

Figure 5:
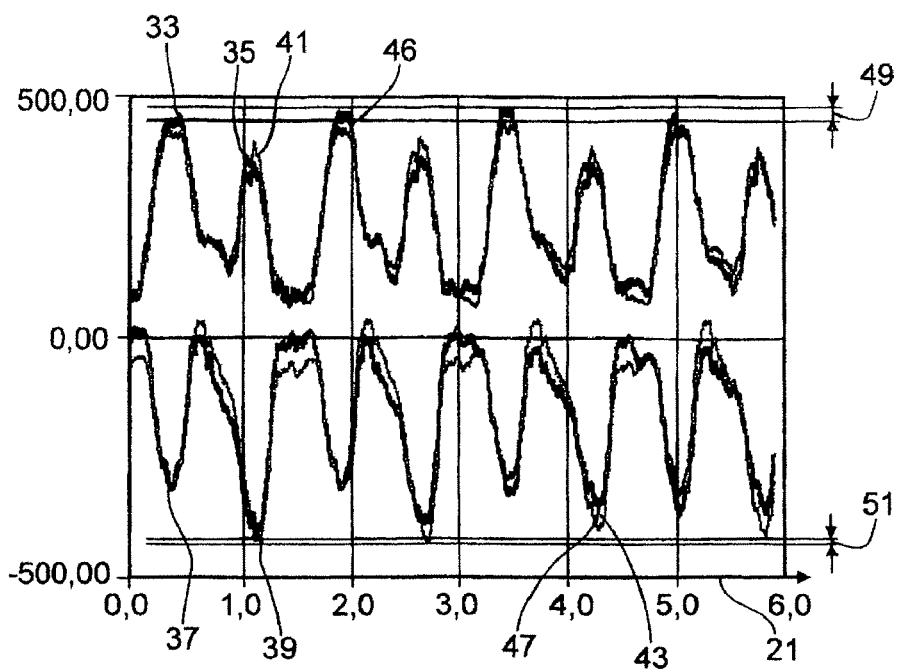
FIG. 5 shows a signal profile with fine calibration.

FIG. 5 represents a signal profile with coarse calibration and a signal profile with fine calibration.

In contrast to the coarse calibration as represented in FIG. 4, for the fine calibration as represented in FIG. 5 the value of the zero measurement, which was determined at the same position, is respectively subtracted from the value measured with a loaded shaft. To this end, for example with a trigger signal as represented in FIG. 4, it is necessary to determine the exact position of the stripping shaft.

By comparing the finely calibrated signal profile with the coarsely calibrated signal profile, it can be seen that different values are determined particularly at the maxima 33, 35 and minima 37, 39. For instance, the finely calibrated signal profile in the x direction 45 shows larger values for the first minimum 33 than the coarsely calibrated signal profile in the x direction 41, while the coarsely calibrated signal profile in the x direction 41 gives larger values for the second maximum 35. Correspondingly, for the deviation in the y direction as well, a larger value is found for the first minimum 37 in the finely calibrated signal profile in the y direction 47, while the second minimum 39 has a larger value than in the coarsely calibrated signal profile in the y direction 43.

The greatest bending of the stripping shaft 3 or the stirring shaft 1 is obtained for the maximum deflection. This means that the bending of the shafts 1, 3 is greatest for the maximum deflection. FIG. 5 represents the difference 49 of the maximum deflection in the x direction between coarse calibration and fine calibration, as well as the difference 51 of the maximum deflection in the y direction between representations with coarse calibration and fine calibration.

The difference between fine and coarse calibration is always less than the distance between the maximum and minimum values of the zero measurement $x_{Opp}$, $y_{Opp}$. For reliable evaluation, the values $x_{Opp}$ and will respectively be added in coarse calibration.

Figure 6:
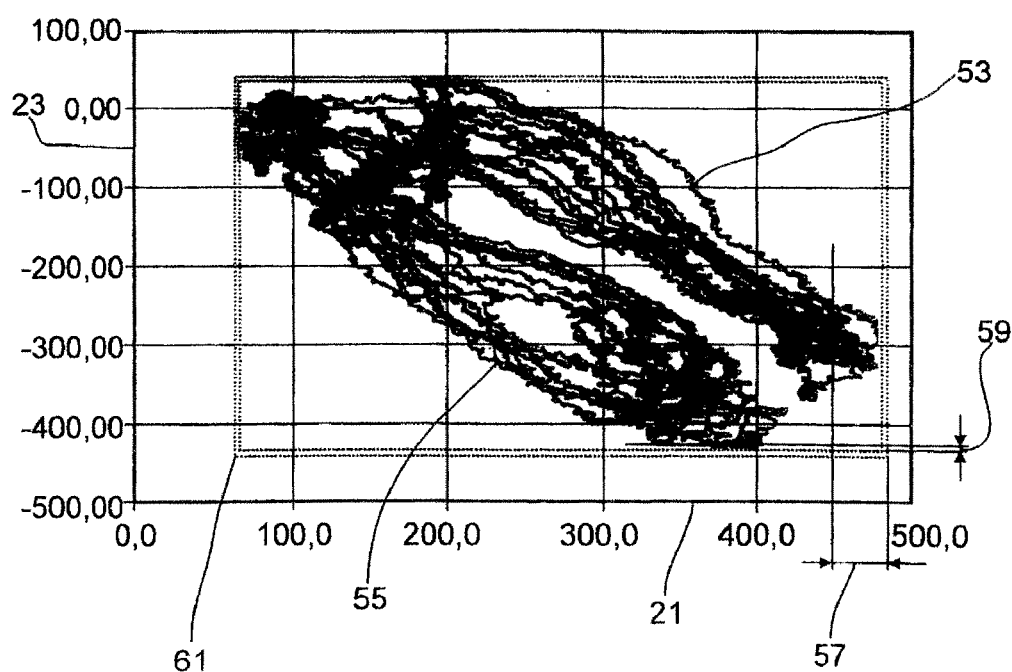
FIG. 6 shows an orbital representation with an envelope curve.

FIG. 6 shows an orbital representation with an envelope curve. The shaft oscillation in the x direction is plotted therein on the x axis 21, and the shaft oscillation in the y direction is plotted on the y axis 23. The curves represented show on the one hand the shaft oscillation 53 with coarse calibration, and also the shaft oscillation 55 with fine calibration. As described above with reference to FIG. 5, a difference 57 in the x direction and a difference 59 in the y direction are found between the coarsely calibrated representation and the finely calibrated representation.

An envelope curve 61 in the form of a box is placed around the recorded shaft oscillations. The envelope curve 61 is picked so that it respectively contains the maximum measured deviation of the shaft 1, 3. As soon as the envelope curve enclosing the maximum measured deviations exceeds the values for the maximum permissible deviations, measures are implemented. Measures to be implemented are, for example, emitting an alarm or stopping the machine in order to prevent damage.

LIST OF REFERENCES 1 stirring shaft
3 stripping shaft
5 first torque
7 second torque
9 first resistance
11 second resistance
13 force on the stirring shaft 1
15 equivalent distance for the force 13
17 force on the stripping shaft 3
19 equivalent distance for the force 17
21 x axis
23 y axis
25 deviation in x direction
27 deviation in y direction
29 measurement in x direction
31 measurement in y direction
33 first maximum
35 second maximum
27 first minimum
39 second minimum
41 coarsely calibrated signal profile in x direction
43 coarsely calibrated signal profile in y direction
45 trigger signal
46 finely calibrated signal profile in x direction
47 finely calibrated signal profile in y direction
49 difference between the maximum deflections in x direction
51 difference between the maximum deflections in y direction
53 shaft oscillation with coarse calibration
55 shaft oscillation with fine calibration
57 difference in x direction
59 difference in y direction
61 envelope curve

The invention claimed is:

1. A method for monitoring a bending of a shaft, the shaft having a bearing at least on one side, comprising the following steps:
    (a) measuring a deviation of the shaft from a radial position without a load on the shaft
    (b) measuring the deviation of the shaft from the radial position on at least one position different from the bearing of the shaft,
    (c) determining a reference value from the measured deviation from the radial position, the reference value being an absolute value of a difference between the deviation from the radial position as measured without a load on the shaft and the deviation with a loaded shaft,
    (d) comparing the reference value found in step (c) with a predetermined limit value.

2. The method as claimed in claim 1, wherein at least two sensors mutually offset in a circumferential direction are used for the measurement, in order to record the direction of the deviation from the radial position.

3. The method as claimed in claim 2, wherein the deviation from the radial position as measured by the at least two sensors or the reference value is represented in an orbital representation.

4. The method as claimed in claim 3, wherein the limit value, with which the deviation from the radial position is compared, forms an envelope curve in the orbital representation.

5. The method as claimed in claim 1, wherein the limit value is determined from the maximum permissible bending of the shaft.

6. The method as claimed in claim 5, wherein the limit value is the absolute value of the difference between the deviation from the radial position without a load on the shaft and the maximum permissible deviation.

7. The method as claimed in claim 5, wherein the shaft is stopped if the limit value is exceeded.

8. The method as claimed in claim 5, wherein when the limit value is reached or exceeded, a solids content is reduced, a part of solid additives or fine grain material being recycled is reduced, a temperature is reduced, a degree of cross-linking of the product is varied, at least one lubricant is added, or a temperature is increased.

9. The method as claimed in claim 1, wherein the circumferential position of the shaft is recorded.

10. The method as claimed in claim 9, wherein a marking, which is recorded by a sensor, is applied on the shaft in order to record the circumferential position.

11. The method as claimed in claim 1, wherein the deviation from the radial position is determined by an eddy current probe.

12. The method as claimed in claim 1, wherein the shaft is in a mixing kneader.

* * * * *